United States Patent Office 3,557,294
Patented Jan. 19, 1971

---

3,557,294
FLUORINATED ETHERS AS INHALATION CONVULSANTS
Robert E. A. Dear and Everett E. Gilbert, Morristown, N.J., assignors to Allied Chemical Corporation, New York, N.Y., a corporation of New York
No Drawing. Filed Oct. 12, 1967, Ser. No. 674,746
Int. Cl. A61k 27/00
U.S. Cl. 424—342                5 Claims

ABSTRACT OF THE DISCLOSURE

This application relates to the use of certain fluorinated ethers as inhalation convulsants and to certain of these ethers which are novel per se.

---

The ethers of this invention which are useful as inhalation convulsants fall into three general categories which are described by the formulae set forth below:

(a)     $CXF_2(CF_2)_nCH(R)OCF_2CHX'Y$ where X equals F or H; n is 0, 1, 2 or 3; R is H or $CF_3$; X' is H, F or Cl; and Y is $CF_3$, Cl, Br, H or F;

(b)

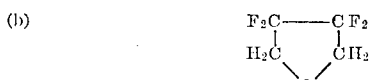

(c)

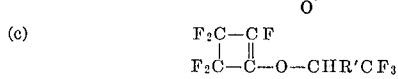

where R' is H or $CF_3$.

The ethers of this invention which are novel per se are described by the formulae set forth below:

(d)     $CXF_2(CF_2)_nCH(R)OCF_2CHX'Y$ where:
X is F or H,
n is 0, 1, 2 or 3
R is H or $CF_3$
X' is H, F or Cl
Y is $CF_3$, Cl, Br, H or F, and, when X'=F n is >0.

(e)

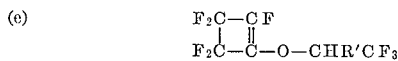

where R' is H or $CF_3$.

BACKGROUND OF THE INVENTION

This application relates to the use of certain cyclic and straight-chain ethers as inhalation convulsants and also to certain of these cyclic and straight chain ethers which are novel per se.

Inhalation convulsants are sometimes used by the medical profession as substitutes for electro-convulsive shock treatments since they have certain advantages thereover. Patients are often less apprehensive about inhaling the vapors of a convulsant agent than about having an electric current passed through their brain. Also the onset of convulsions brought about by inhalation convulsants is somewhat slower than that of those brought about by electric shock, thus giving rise to fewer bone fractures of the type which have, in many cases, occurred as a result of the sudden onset of convulsions caused by electric shock. Furthermore, the depth and duration of the seizures brought about by inhalation convulsants are comparatively easy to control and there are fewer side effects such as loss of memory from such convulsants.

SUMMARY OF THE INVENTION

It is an object of this invention to use certain novel, and other, straight-chain and cyclic ethers as inhalation convulsants.

It is also an object of this invention to develop novel straight-chain and cyclic ether compounds.

Other and further objects of this invention will be apparent to those skilled in the art from a reading of the following specification and claims.

Applicants have now discovered the following novel ethers and have also discovered that these ethers are useful as inhalation convulsants.

(1) 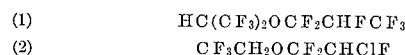
(2) 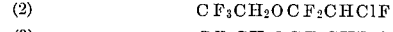
(3) 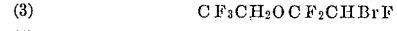
(4) 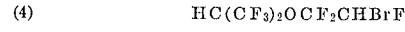
(5) 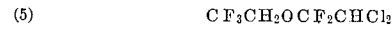
(6) 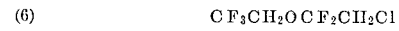
(7) 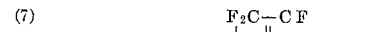
(8) 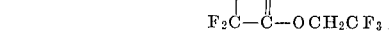
(9) 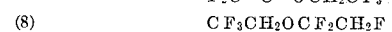
(10) 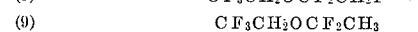
(11) 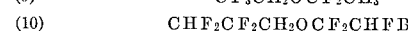
(12) 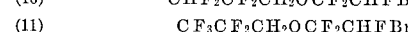
(13) 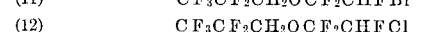
(14)

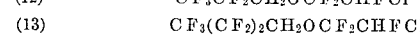

The novel straight chain ethers set forth above fall within the following generic formula:

$$CXF_2(CF_2)_nCH(R)OCF_2CHX'Y$$

where:
X is F or H,
n is 0, 1, 2 or 3
R is H or $CF_3$
X' is H, F or Cl
Y is $CF_3$, Cl, Br, H or F, and when X' is F, n is >0.

The novel cyclic ethers set forth above fall within the following generic formula:

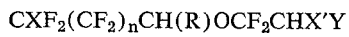

where R' is H or $CF_3$.

The straight chain ethers listed above can be prepared from commercially available starting materials by the following reaction sequence:

(1) $CXF_2(CF_2)_nCH(R)OR + KOH \rightarrow$
     $CXF_2(CF_2)_nCH(R)O^-K^+ + H_2O$ (2) $CXF_2(CF_2)_nCH(R)O^-K^+ + CF_2=CX'Y \rightarrow$
     $[CXF_2(CF_2)_nCH(R)OCF_2CX'Y]^-K^+$ (3) $[CXF_2(CF_2)_nCH(R)OCF_2CX'Y]^-K^+ + H_2O \rightarrow$
     $CXF_2(CF_2)_nCH(R)OCF_2CHX'Y + KOH$ The perfluorocyclobutenyl ethers of compounds 7 and 14 can also be prepared according to these reactions. For example, compound 7 can be prepared by the addition of trifluoroethanol to perfluorocyclobutene, followed by spontaneous dehydrofluorination to give perfluorocyclobutenyl trifluoroethyl ether.

In addition to the fourteen novel convulsant compounds set forth above applicants have also discovered that the compounds

(15) $CF_3CH_2OCF_2CHF_2$
(16) $CF_3CH_2OCF_2CHFCF_3$ and

(17) 

are useful as inhalation convulsants.

Applicants' convulsant ethers thus fall into three general categories which are described by the formulae set forth below:

(a) $CXF_2(CF_2)_nCH(R)OCF_2CHX'Y$ where:
X is F or H
$n$ is 0, 1, 2 or 3
R is H or $CF_3$
X' is H, F or Cl, and
Y is $CF_3$, Cl, Br, H or F (b) 

(c) 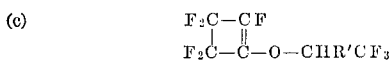

Compounds 15, 16 and 17 are known compounds, having been reported respectively by A. L. Henne and M. A. Smook, J. Am. Chem. Soc. 72 4378 (1950); V. A. Gubanov, et al., J. Gen. Chem. U.S.S.R. 35 399 (1956) Eng. Trans.; and A. L. Henne and S. B. Richter, J. Am. Chem. Soc. 74 5420 (1952).

Compound 15 can be prepared by reacting 2,2,2-trifluoroethanol with sodium and perfluoroethylene in the manner more particularly described in the Henne and Smook reference. Compound 16 can be prepared by the above described process for preparing straight chain ethers using KOH, while the latter compound can be prepared by the following reaction:

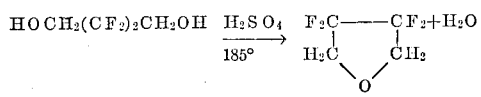

which is disclosed in the Henne and Richter reference cited above.

It is particularly surprising that compound 17 set forth above had convulsant properties, since the analogous hexafluorotetrahydropyran has been shown not to be a convulsant. See Burns et al., Anesthesia, 19, 167 (1964). Similarly it is particularly surprising that compounds 7 and 14 set forth above are convulsants since the similar compound perfluorocyclohexenyl trifluoroethyl ether, disclosed in J. Chem. Soc. (1965) 7359, is a non-convulsant. Furthermore, it is surprising that the above compounds 2 ($CF_3CH_2OCF_2CHClF$), 5 ($CF_3CH_2OCF_2CHCl_2$) and 6 ($CF_3CH_2OCF_2CH_2Cl$)

exhibit convulsant properties since the closely related vinyl ethers $CF_3CH_2OCF=CFCl$, $CF_3CH_2OCF=CCl_2$ and $CF_3CH_2OCF=CHCl$ are anesthetics, as disclosed in British Patent No. 782,477. It is also surprising that the above compounds 1 [$HC(CF_3)_2OCF_2CHFCF_3$] and 4 [$HC(CF_3)_2OCF_2CHBrF$] are convulsants since the closely related compound $HC(CF_3)(CH_3)OCF_2CHFCl$ is an anesthetic as disclosed in the copending commonly assigned U.S. application of Robert E. A. Dear and Everett E. Gilbert, filed of even date herewith (P. D. File 5300–1238). Finally, it is surprising that compound 9

($CF_3CH_2OCF_2CH_3$)

is a convulsant, since its isomer $CH_3OCF_2CHFCF_3$ is an anesthetic as disclosed in the copending commonly assigned U.S. application of Robert E. A. Dear and Everett E. Gilbert, filed of even date herewith (P. D. File 5300–1238).

DESCRIPTION OF THE PREFERRED EMBODIMENT

The convulsants of this invention have been found to be effective when administered to mice, as evidenced by the following table.

TABLE I

| Compound | Convulsant concentration, percent by volume | $LD_{50}$, percent by volume | Remarks |
|---|---|---|---|
| 1 | 1.94 | >5.81 | Metrazol type convulsions beginning at 2½ min. and repeated throughout |
| 16 | 1.01 | >7.58 | Metrazol type convulsions at 1½ min. |
| 2 | 0.66 | 2.49 | Metrazol type convulsions at 30 seconds. |
| 3 | 0.64 | 2.37 | Metrazol type convulsions at 30 and 40 seconds. |
| 4 | 0.53 | 1.82 | Arched back seizures (Metrazol type) at 1½ min. |
| 5 | 0.63 | 5.15 | Arched back seizures (Metrazol type). |
| 6 | | 2.78 | Arched back seizures. |
| 17 | 0.94 | 3.81 | Sustained convulsions for several min. |
| 7 | 0.37 | 0.576 | Metrazol type convulsions at 1 min. and repeated throughout. |
| 8 | 0.74 | 1.21 | Arched back seizures after 30 seconds. Severe repeated convulsions. |
| 9 | 1.16 | >8.74 | Arched back seizures. |
| 10 | 0.058 | 0.065 | Arched back seizures severely repeated. |
| 11 | 0.065 | 0.115 | Convulsant. |
| 12 | 0.11 | 0.316 | Do. |
| 13 | 0.19 | 0.387 | Do. |
| 15 | 0.71 | 0.941 | Do. |

The convulsant ethers set forth in Table I were tested by administering the ethers to mice in a test similar to that described by Robbins, J. Pharmacology and Experimental Therapeutics, 86 197–204 (1946).

In the test as carried out, 5 mice were placed in each of a number of 6.3 liter animal jars, wherein the mice were subjected to various dose levels of inhalation convulsant vapors. Ten mice (5 in each of 2 jars) were used for each dose level. Convulsant activity was noted when it appeared. Dosages were increased above that required to induce convulsions, and a minimum of 3 graded dosages, injected at 0.1 ml. per 10 seconds was used to establish that dose required to kill 50% of the mice ($LD_{50}$). The concentration of convulsant vapors in the jar was calculated using the ideal gas law (see Carson et al. Anesthesiology, 23 187 (1962)). The results are shown in Table I above.

Various properties of those compounds set forth above as being novel are presented in the following table:

Elemental and N.M.R. analysis confirmed the structure of the compound.

TABLE II

| Compound No. | Formula | B.P., °C. | Refractive index, $n_D^{25}$ | Calculated C | Calculated H | Calculated Cl | Calculated Br | Found C | Found H | Found Cl | Found Br |
|---|---|---|---|---|---|---|---|---|---|---|---|
| 1 | $HC(CF_3)_2OCF_2CHFCF_3$ | 77 | <1.3 | 22.65 | 0.63 | | | 22.87 | 0.84 | | |
| 2 | $CF_3CH_2OCF_2CHClF$ | 82 | 1.3066 | 22.19 | 1.40 | 16.37 | | 22.02 | 1.51 | 16.28 | |
| 3 | $CF_3CH_2OCF_2CHBrF$ | 97 | 1.3306 | 18.40 | 1.16 | | 30.62 | 18.59 | 1.24 | | 30.41 |
| 4 | $HC(CF_3)_2OCF_2CHBrF$ | 97 | 1.3110 | 18.25 | 0.61 | | 24.29 | 18.54 | 0.68 | | 24.22 |
| 5 | $CF_3CH_2OCF_2CHCl_2$ | 109 | 1.3439 | 20.69 | 1.30 | 30.54 | | 20.40 | 1.06 | 30.47 | |
| 6 | $CF_3CH_2OCF_2CH_2Cl$ | 87 | 1.3119 | 24.20 | 2.03 | 17.86 | | 24.41 | 2.00 | 18.05 | |
| 7 |  | 95 | 1.3120 | 29.76 | 0.83 | | | 29.99 | 0.92 | | |
| 8 | $CF_3CH_2OCF_2CH_2F$ | 64.5 | <1.3 | 26.38 | 2.22 | | | 26.56 | 2.41 | | |
| 9 | $CF_3CH_2OCF_2CH_3$ | 39 | <1.3 | 29.28 | 3.07 | | | 29.66 | 3.00 | | |
| 10 | $CHF_2CF_2CH_2OCF_2CHFBr$ | 130.5 | 1.3425 | 20.49 | 1.38 | | 27.28 | 20.85 | 1.65 | | 27.66 |
| 11 | $CF_3CF_2CH_2OCF_2CHFBr$ | 108 | 1.3210 | 19.31 | 0.97 | | 25.70 | 19.14 | 0.82 | | 25.17 |
| 12 | $CF_3CF_2CH_2OCF_2CHFCl$ | 93.5 | 1.3015 | 22.53 | 1.14 | | | 22.96 | 1.38 | | |
| 13 | $CF_3(CF_2)_2CH_2OCF_2CHFCl$ | 112.5 | 1.3024 | 22.77 | 0.96 | 11.20 | | 22.87 | 0.99 | 10.68 | |
| 14 |  | 81 | <1.3 | 27.11 | 0.33 | | | 27.29 | 0.32 | | |

The following examples are illustrative of the method of preparation of the convulsant compounds of this invention.

EXAMPLE 1

33.6 grams (0.2 mole) of 1,1,1,3,3,3-hexafluoroisopropanol were placed in a glass (Fisher Porter aerosol compatibility) tube and 3 grams of potassium hydroxide were dissolved therein. The tube was closed, cooled to about −78° C. and evacuated and 30 grams (0.2 mole) of perfluoropropylene were condensed in from a cylinder. The tube was allowed to reach room temperature and reaction was allowed to take place over a period of about 10 days until no pressure remained in the tube. Distillation of the resulting liquid yielded compound 1 above, $$[HC(CF_3)_2OCF_2CHFCF_3]$$

Elemental and N.M.R. analysis confirmed the structure of the compound.

EXAMPLE 2

30 grams (0.3 mole) of 2,2,2-trifluoroethanol were placed in a glass F.P. tube and 2 grams (0.03 mole) of potassium hydroxide were dissolved therein. The tube was then cooled to −78° C. and 45 grams (0.3 mole) of perfluoropropylene were introduced thereinto by vacuum technique. The tube was then allowed to warm to room temperature and the contents were magnetically stirred. An exothermic reaction occurred together with rise in pressure to 170 p.s.i.g. Over a period of several days the pressure dropped to about 40 p.s.i.g. The pressure was released and a white solid was allowed to settle out and a colorless liquid was decanted and distilled to yield the compound identified above as 16, $$[CF_3CH_2OCF_2CHFCF_3]$$

Elemental and N.M.R. analysis confirmed the structure of the compound.

EXAMPLE 3

In a 300 ml. stainless steel bomb was placed a solution consisting of potassium hydroxide (20 grams; 0.3 mole based on 85% purity) dissolved in a minimum quantity of 2,2,2-trifluoroethanol (sufficient to yield about 70 grams of solution). The bomb was cooled to −78° C., evacuated and 35 grams (0.3 mole) of monochlorotrifluoroethylene were introduced thereinto. The bomb was sealed and allowed to stand 65 hours at room temperature during which time the pressure rose to 65 p.s.i.g. and then fell slowly to less than 10 p.s.i.g. The excess pressure was released and the contents poured into a beaker. The liquid was diluted with water and the lower organic liquid layer was separated, dried and distilled and yielded the compound identified above as number 2

EXAMPLE 4

20 grams (0.3 mole based on 85% purity) of potassium hydroxide were dissolved in 100 grams of 2,2,2-trifluoroethanol. The solution was charged to a 300 ml. stainless steel bomb and 48.3 grams (0.3 mole) of bromotrifluoroethylene were added thereto at −78° C. through a vacuum manifold system. The bomb was allowed to warm to ambient temperature and stand for about 40 hours. During this period the pressure therein rose to about 30 p.s.i.g. and then fell to less than 5 p.s.i.g. The bomb was vented to the atmosphere and its contents transferred to a separatory funnel where the organic material was washed with water to remove excess alcohol, dried and distilled. Distillation yielded 63.4 grams of compound 3 $[CF_3CH_2OCF_2CHBrF]$ identified above, 81% of the theoretical yield. The compound was identified by elemental analysis and infrared and proton N.M.R. spectra.

EXAMPLE 5

20 grams of potassium hydroxide (0.3 mole based on 85% purity) were dissolved in 120 grams of 1,1,1,3,3,3-hexafluoroisopropanol. The resultant solution was placed in a 300 ml. stainless steel bomb and 48.3 grams (0.3 mole) of bromotrifluoroethylene were introduced in the usual manner. The bomb was then allowed to warm to room temperature. A pressure of 20 p.s.i.g. developed. This did not decrease with time, indicating no reaction, so the bomb was warmed on a steam bath for two hours. Pressure dropped to 0 p.s.i.g. The bomb was cooled, opened and the contents were poured into water which was adjusted to a pH of 9–10 with aqueous potassium hydroxide in order to insure complete removal of alcohol solvent. The organic layer was dried and distilled and yielded the compound identified above as number 4, $[HC(CF_3)_2OCF_2CHBrF]$. Infrared and elemental analysis confirmed the structure of the compound.

EXAMPLE 6

20 grams (0.3 mole) of potassium hydroxide were dissolved in 100 grams of 2,2,2-trifluoroethanol. The solution was placed in a long, narrow trap fitted with a gas inlet tube and a Dry Ice methylene chloride, reflux cooled condenser. 40 grams (0.3 mole) of 1,1-dichlorodifluoroethylene were passed in at ambient temperature (23° C.) over a period of about 2 hours. A considerable increase in volume of the contents of the trap was observed and the trap became warm to the touch (about 45° C.). A white precipitate appeared. The mixture was allowed to stand overnight and then poured into water to remove the excess alcohol, and the dried material was distilled resulting in 36.6 grams of compound 5 identified above,

This was a 52.4% yield. The structure was confirmed by infrared and proton N.M.R. spectra and by elemental analysis.

EXAMPLE 7

20 grams of potassium hydroxide (0.3 mole) were dissolved in 100 grams of 2,2,2-trifluoroethanol and the solution was poured into a 300 ml. stainless steel bomb. The bomb was sealed, cooled and evacuated and 32.5 g. of 1-chloro-2,2-difluoroethylene (0.33 mole) were added through a vacuum line. The bomb was then allowed to warm to room temperature and stand for 72 hours. After this time pressure was 20 p.s.i.g. indicating incomplete reaction. The bomb was warmed to 40° C. and pressure rose to about 40 p.s.i.g. and then dropped rapidly to 0 p.s.i.g., the bomb was opened and the contents washed with water and then distilled and yielded the compound identified as compound number 6 above

[CF$_3$CH$_2$OCF$_2$CH$_2$Cl]

Elemental and N.M.R. analysis confirmed the structure of the compound.

EXAMPLE 8

A mixture of 91 grams (0.55 mole) of 2,2,3,3-tetrafluorobutane-1,4-diol and 15 g. of concentrated sulfuric acid was placed in a flask and heated in an oil bath at 185° to 190° C. The outlet of the flask was fitted with a takeoff head, condenser and receiver. During a 3 hour period a mixture of ether and water slowly distilled. The crude ether was collected, dried and distilled to yield 53.5 grams (67.2% of theoretical yield) of 3,3,4,4-tetrafluorotetrahydrofuran. The physical constants of the cyclic ether were measured and were in agreement with those reported by Henne and Richter in the reference cited above. Confirmation of the structure was provided by elemental analysis. The structure was that of compound number 17 above

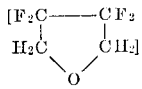

EXAMPLE 9

A solution of potassium hydroxide (20 grams, 0.3 mole based on 85% purity) was prepared in 2,2,2-trifluoroethanol (100 grams, 1 mole) and charged to a 300 ml. stainless steel bomb. The bomb was closed, cooled and evacuated and 51 grams (0.314 mole) of perfluorocyclobutene were condensed thereinto. The bomb was warmed to room temperature and allowed to stand for 16 hours. A pressure of 30 p.s.i.g. developed and then rapidly decreased. The bomb was opened and the contents poured into a separatory funnel and washed with 250 ml. of water. The lower organic layer was separated and distilled to yield compound number 7 above

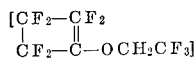

Elemental and N.M.R. analysis confirmed the structure of the compound.

EXAMPLE 10

20 grams (0.3 mole) of potassium hydroxide pellets were dissolved in 100 grams of 2,2,2-trifluoroethanol and the resulting solution was charged to a 300 ml. stainless steel bomb. The bomb was cooled, evacuated and 34 grams (0.415 mole) of trifluoroethylene were added thereto. The bomb was then brought to room temperature and allowed to stand overnight. The next morning the bomb was heated by being placed in a steam-filled copper coil until the temperature stabilized at 87° C. Initial pressure in the bomb was about 230 p.s.i.g. After about 24 hours the pressure had dropped to about 54 p.s.i.g. The reaction was stopped and the bomb was cooled and opened. The reaction mixture, which was pale yellow, was poured into water, separated, and dried over calcium sulfate.

During the drying period the liquid went from yellow to green to purple to purple-black to straw in color. Distillation of the dried liquid yielded 60.6% (based on trifluoroethylene) of the compound identified above as number 8, [CF$_3$CH$_2$OCF$_2$CH$_2$F]. The structure of the compound was confirmed by elemental and N.M.R. analysis.

EXAMPLE 11

20 grams (0.3 mole) of potassium hydroxide were dissolved in 100 grams of 2,2,2-trifluoroethanol. The solution was poured into a 300 ml. stainless steel bomb which was then sealed, cooled in liquid nitrogen and evacuated. 27 grams (0.422 mole) of 1,1-difluoroethylene were added thereto and the bomb was allowed to warm to room temperature. The pressure in the bomb rose to about 400 p.s.i.g. and then dropped to about 310 p.s.i.g. on shaking of the bomb. The bomb was then steam heated for about 120 hours. At the end of this time the pressure in the bomb had dropped to about 0 p.s.i.g. The bomb was vented and opened and the contents poured into water. The organic layer was separated. 54.4 grams of crude material were thus obtained. Distillation of the crude material yielded the compound identified above as 9

[CF$_3$CH$_2$OCF$_2$CH$_3$]

The structure was confirmed by elemental and N.M.R. analysis.

EXAMPLE 12

20 grams (0.3 mole based on 85% purity) of potassium hydroxide were added to 100 grams of 2,2,3,3-tetrafluoropropanol. Not all of the solid dissolved. The liquid became pale yellow and very viscous. The solution and the undissolved potassium hydroxide were placed in a 300 ml. stainless steel bomb and the bomb was sealed, cooled to −78° C. and evacuated. 48.3 grams (0.3 mole) of bromotrifluoroethylene were introduced into the bomb through a vacuum manifold. The bomb was then allowed to warm to room temperature (about 25° C.). The internal pressure in the bomb rose to about 25 p.s.i.g. and then over a period of about 4½ hours fell to about 0 p.s.i.g. The bomb was allowed to stand over the weekend and was then opened and the contents poured into water. The organic layer was separated, dried and distilled. It yielded 89.4 grams (85.2% yield based on the olefin used) of the compound identified above as number 10,

[CHF$_2$CF$_2$CH$_2$OCF$_2$CHFBr]

The structure of this compound was confirmed by elemental and N.M.R. analysis.

EXAMPLE 13

20 grams (0.3 mole based on 85% purity) of potassium hydroxide were slurried with 90 grams of 2,2,3,3,3-pentafluoropropanol. Most of the base dissolved. The resulting viscous suspension was charged to a 300 ml. stainless steel bomb and the bomb was sealed, cooled to −78° C. and evacuated. 53 grams (0.33 mole) of bromotrifluoroethylene were added to the bomb through a vacuum manifold. The bomb was allowed to warm to 25° C. and stand undisturbed for 21 hours. During this period the pressure rose to about 25 p.s.i.g. and then dropped to about 5 p.s.i.g. The bomb was allowed to stand for a further 7 hours during which the pressure dropped to about 0 p.s.i.g. The bomb was then opened and the contents poured into water. The organic layer was separated, dried and distilled and yielded the compound identified above as number 11,

[CF$_3$CF$_2$CH$_2$OCF$_2$CHFCl]

The structure of this compound was confirmed by elemental and N.M.R. analysis.

EXAMPLE 14

20 grams (0.3 mole based on 85% purity) of potassium hydroxide were dissolved in 5 gram portions in 100 grams (0.5 mole) of 1,1-dihydroperfluoropropanol. The resulting viscous solution was poured into a 300 ml. stainless steel bomb, which was then closed, cooled and evacuated. 42 grams (0.36 mole) of chlorotrifluoroethylene were then introduced into the bomb through a vacuum manifold. The bomb was then allowed to warm to room temperature and stand undisturbed overnight. The pressure rose to about 60 p.s.i.g. and then gradually fell. The next morning the pressure was 0 p.s.i.g. The total reaction time was about 18 hours. The bomb was opened and the contents were poured into water. The organic layer was separated and dried over calcium sulfate. 81.4 grams of crude material were thus obtained. The crude material was distilled and yielded the compound identified above as number 12,

[$CF_3CF_2CH_2OCF_2CHFCl$]

The structure of this compound was confirmed by elemental and N.M.R. analysis.

EXAMPLE 15

20 grams (0.3 mole assuming 85% purity) of potassium hydroxide were added to 100 grams of 1,1-dihydroperfluorobutanol. The base did not dissolve completely and formed a pale yellow viscous suspension. This suspension was poured into a 300 ml. stainless steel bomb and 35 grams (0.3 mole) of chlorotrifluoroethylene were introduced thereinto through a vacuum manifold. The bomb was allowed to warm to room temperature and stand undisturbed for 16 hours. The pressure at that time was 60 p.s.i.g. and showed no signs of decreasing. The bomb was placed in a bucket of hot water (50° C.) for 1½ hours. The pressure rose to 75 p.s.i.g. and then fell rapidly to 0 p.s.i.g. The bomb was vented and opened and the contents were poured into about 500 ml. of water. The lower, organic layer was separated yielding 89.3 grams of crude material. Distillation of the crude material yielded the compound identified above as number 13,

[$CF_3(CF_2)_2CH_2OCF_2CHFCl$]

The structure of this compound was confirmed by elemental and N.M.R. analysis.

EXAMPLE 16

20 grams (0.3 mole assuming 85% purity) of potassium hydroxide were dissolved in 100 grams of 2,2,2-trifluoroethanol and the resulting solution was added to a 300 ml. stainless steel bomb. The bomb was closed, cooled with liquid nitrogen and evacuated. 10 liters (about 0.42 mole) of tetrafluoroethylene were introduced thereinto via a vacuum manifold system. The bomb was then closed and allowed to stand at room temperature for about 13 days. A maximum pressure of about 395 p.s.i.g. developed. At the end of the 13 days the pressure had fallen to about 195 p.s.i.g. and was constant. The bomb was vented and the contents poured into water. The colorless lower layer was separated. Distillation of this layer yielded the compound identified above as number 15,

[$CF_3CH_2OCF_2CHF_2$]

Confirmation of the structure of this compound was made by elemental and N.M.R. analysis.

EXAMPLE 17

20 grams (0.3 mole based on 85% purity) of potassium hydroxide were dissolved in 120 ml. of 1,1,1,3,3,3-hexafluoroisopropanol in four 5 gram portions. The resulting viscous clear solution was poured into a 300 ml. bomb and the bomb was closed, cooled and evacuated. 45 grams (0.278 mole) of perfluorocyclobutene were added to the bomb which was then allowed to warm to room temperature and stand undisturbed over the weekend. The bomb was then opened and the contents thereof were poured into water. The organic layer was separated and dried over calcium sulfate. Distillation of this dried material in a spinning band column yielded the compound identified above as number 14

$$[\begin{matrix} F_2C-CF \\ | \quad \| \\ F_2C-COC(CF_3)_2H \end{matrix}]$$

Structure of the compound was confirmed by elemental and N.M.R. analysis.

While this invention has been described with particular reference to specific embodiments, it is to be understood that is not limited thereto but is to be construed broadly and restricted solely by the scope of the appended claims.

We claim:

1. The process for producing convulsions which comprises administering to a patient in need of having convulsions induced a convulsion producing dosage of the vapors of a compound having the formula $HC(CF_3)_2OCF_2CHBrF$ 2. The process for producing convulsions which comprises adminstering to a patient in need of having convulsions induced a convulsion producing dosage of the vapors of a compound having the formula $CHF_2CF_2CH_2OCF_2CHFBr$ 3. The process for producing convulsions which comprises administering to a patient in need of having convulsions induced a convulsion producing dosage of the vapors of a compound having the formula $CF_3CF_2CH_2OCF_2CHFBr$ 4. The process for producing convulsions which comprises administering to a patient in need of having convulsions induced a convulsion producing dosage of the vapors of a compound having the formula $CF_3CF_2CH_2OCF_2CHFCl$ 5. The process for producing convulsions which comprises administering to a patient in need of having convulsions induced a convulsion producing dosage of the vapors of a compounds having the formula $CF_3(CF_2)_2CH_2OCF_2CHFCl$

References Cited

Ling et al., Survey of Anesthesiology, June 1961, pp. 248 and 249.

JEROME D. GOLDBERG, Primary Examiner

U.S. Cl. X.R.

260—614